Patented Dec. 23, 1952

2,623,071

UNITED STATES PATENT OFFICE 2,623,071

PREPARATION OF SUBSTITUTED CYCLOPENTENONES

Albert Frank Bowles, Naugatuck, Conn., assignor to The Synor Research Laboratories, Inc., Middletown, Conn., a corporation of Connecticut No Drawing. Application May 13, 1948, Serial No. 26,933

1 Claim. (Cl. 260—586)

This invention relates to cycloaliphatic compounds having aliphatic or aralkyl substituents in its 2 and 3 ring positions and more particularly relates to the manufacture of cycloaliphatic bodies useful in the preparation of synthetic aromatic compounds, germicides, antibiotics and substituted amino acids.

I have discovered that cycloaliphatic compounds derived from cyclopenten-2-one-1 having from 4 to 8 carbon atoms as a side chain substituted for ring hydrogen, particularly those having five carbon atoms in their ring and having side chains substituted in their 2, 3 and either 4 or 5 positions, particularly of from 3 to 20 carbon atoms as an aliphatic substituent in the 2 position and not more than 8 in the 3 position, and having a polybasic acid substituted in its 4 or 5 position, are suitable antibiotic bases as well as readily applicable for preparing highly specialized perfume and flavor intermediates.

Where the compounds of my invention have an aliphatic substituent in its 2 position of not more than 20 carbon atoms, the terminal of which is carboxylic acid, hydroxy or alkoxy, and where the 3 position is substituted by an alkyl group of not more than 8 carbon atoms, or is substituted by an aralkyl, the alkyl of which has not more than 8 carbon atoms, although the aromatic nucleus itself may also have ring or nuclear hydrogen atoms substituted by lower alkyls of not more than 3 carbon atoms, hydroxy or a carboxy group, and having the aliphatic substitutient in position 2 further substituted on its alpha carbon group by an amino group and a mercapto group on its beta carbon atom, such amino acid compounds are suitable for the preparation of substituted thiazolidine compounds, which are, in turn, readily converted into highly specialized oxazolone antibiotics.

The compounds of my invention are represented by the following structural formula:

I  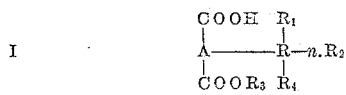

wherein: R is the cycloaliphatic nucleus of the cyclopenten-2-one-1 group.

is a radical of a polybasic acid wherein $R_3$ is hydrogen or alkyl. $R_1$ is an alkyl radical having not more than 8 carbon atoms or an aralkyl radical having not more than 8 carbon atoms in its side chain and in which the aromatic radical may also have other alkyl groups of not more than 3 carbon atoms substituted for nuclear hydrogen atoms and may also have other nuclear hydrogen atoms replaced by hydroxy and carboxy groups. It was found that aromatic reactants from the benzene series of hydrocarbons are best suited as substituents in this group of cyclopenten-2-one-1, although cyclopentanophenanthrene radicals having an aliphatic group in its 3 position could be used in some reactions for preparing specialized antibiotics. $n.R_2$ is an aliphatic radical having not more than 20 carbon atoms. $R_4$ represents an =O group. This group may be replaced by

wherein $R_5$ is H, OH, O—alkyl, and COOH, by hydrogenation or synthesis.

More specifically the compounds of my invention are represented by the following structural formula:

II  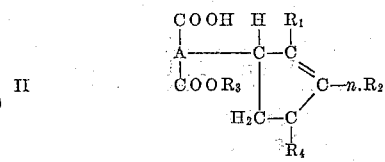

wherein the substituents are the same as defined above.

The general object of this invention is the manufacture of cyclopenten-2-one-1 bodies having its 2 and 3 ring positions substituted by an aliphatic and alkyl group, the aliphatic substituent having a functional terminal group attached to a carbon atom, which are useful for preparing perfume and flavor intermediates, highly specialized germicides, antibiotics and aminoacids.

A specific object of this invention relates to the cycloaliphatic compounds, suitable as intermediates for preparing amino acids, germicides and antibiotics, which cycloaliphatic compounds have the generic structural formula:

wherein R is the cyclopenten-2-one-1 nucleus. $R_1$ is a group selected from the class consisting of alkyl of not more than 8 carbon atoms, aralkyl, the aromatic radical of which is selected from the benzene series of hydrocarbons, having not less than one of its nuclear hydrogens substituted by other functional groups, or an alkyl group having not more than 8 carbon atoms. $n-R_2$ is an aliphatic group having not more than 20 carbon atoms and $R_2$ signifies a polar group consisting of hydroxy, alkoxy or carboxylic acid.

In the structural formula above, the 2 position as indicated by $n-R_2$ may be substituted on its alpha and beta carbon groups by an amino ($NH_2$) or mercapto (SH) group, and on carbon groups further than the delta carbon, may also contain branched alkyl carbon chains, however this is not of a preferred class, since such compounds are useful only as perfume and flavor intermediates. It is preferred that the substituent of not more than 20 carbons in position 2 be straight chain aliphatic. However, the substituent in position 3 ($R_1$) may be either alkyl or aralkyl, and the aryl may preferably have a hydroxy or carboxylic acid group, and also may have a methyl, ethyl or propyl group in a position meta to the hydroxy or carboxy group.

The cyclopenten-2-one-1 nuclei of my invention may be most conveniently prepared by a modification of the methods given in Feiser & Feiser, Organic Chemistry, page 321. Ber. 29:1192; Ber. 18-R-26; Ann. 208:104 and 216:56; so that polysubstituted compounds result. Such compounds as lactones having 4 and 5 carbon atoms in their molecule, and having an alkyl or aralkyl group of not more than 8 carbons in its chain substituted for a hydrogen atom of the alpha carbon group, and having a gamma carbon hydrogen substituted for an aliphatic group of not more than 20 carbon atoms, and having a polar group terminal, are suitable for direct condensation and cyclization, whereby the compounds of my invention are readily prepared. Such compounds may be conveniently represented by the formula:

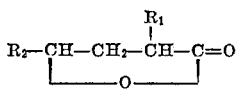

in which $R_1$ and $R_2$ are alpha and gamma substituted groups on the butyryl lactone. $R_1$ may be alkaryl or alkyl provided the alkyl chain contains not more than 8 carbon atoms and $R_2$ is aliphatic of not more than 20 carbon atoms and has attached to its gamma carbon a hydroxy group.

Wide variations of the cyclopenten-2-one-1 compounds of my invention are possible by means of the malonic acid or ester synthesis and substituents of it. By condensing halogen hydrins and a haloaliphatic hydroxy compound with disodium malonate a doubly substituted malonic acid can be prepared, which readily decarboxylates on heating at not above 160° C. and which may be readily cyclized to form the cyclopenten-2-one-1 nucleus having the substituents $R_1$ and $-n-R_2$.

The cyclopenten-2-one-1 nucleus having an aliphatic group $R_2$ in its position 2 may be readily converted into an alpha amino acid by reacting a halogen compound thereof with sodium acetamido malonic ester or acid, and simultaneously hydrolyzing and decarboxylating the resulting complex.

By halogenating the beta carbon of the amino acid, and reacting with sodium or potassium hydrogen sulfide, the corresponding mercaptan compound is obtained. When these beta mercapto amino acids are condensed or reacted with an amino acid having three or more carbon atoms and having two hydrogen atoms on its omega carbon group substituted by hydroxy and halogen, the compound resulting will be thiazolidines, having the cyclopenten-2-one-1 substituent in its 2 position and an amino acid group of alanine or higher value in its 5 position. These thiazolidines upon condensation with other aliphatic or aromatic, carboxylic acid compounds yield oxazolones, which are when optically activated, antibiotic and germicidal agents.

When the halogen hydrins are used as the primary reagent, it is best to first react these halogen hydrins with a sodium malonic acid, remove the salt split off, again prepare the sodium derivative and react this with the omega halogen aliphatic compound having a hydroxy terminal group. The halogen hydrins of a preferred class may have from 2 to 12 carbon atoms in its molecule. The hydroxy group may be attached to the beta, gamma or delta carbon after reacting the alkylene oxide and hydrogen halide in the cold. The di-substituted malonic acid upon stirring and heating at not above 170–190° C. evolves $CO_2$ and forms a mono carboxylic acid having 2 substituents on its alpha carbon group and which substituents are represented by $R_1$ and $R_2$ in the preceding structures I and II. Upon heating and stirring these compounds at 160–180° C. with an acid washed, anhydrous, silica jell, alumina, modified alumina, or magnesium aluminum silicate, cyclization takes place and the di substituted cyclopenten-2-one-1 compound, used as a nucleus, results.

The course of the reactions evolved in preparing the products of my invention may be conveniently represented by the following equations, of a generic structure:

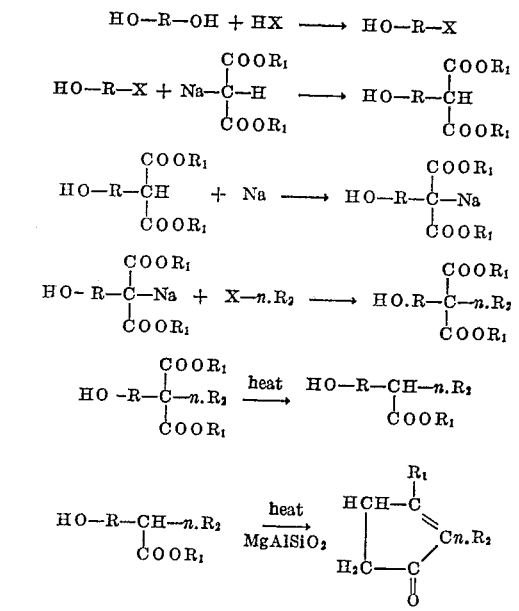

The halogen hydrins (HO—R—X) or epihalogen hydrins may be readily prepared from the alkylene oxides and hydrogen halide in the cold. The temperature at which the reaction takes place is between 10 and 20° C. The temperature should not be allowed above 50° C. The sodium malonic acid is conveniently prepared by conventional methods as described in the literature.

The halogen hydrin having from 2 to 12 carbon atoms, is added to a cold solution of the sodium malonate, preferably in anhydrous alcohol. Salt separates immediately and after a short time is filtered off. The sodium malonic acid is again prepared and to this is added the halogen aliphatic compound, in the cold. The salt separating is again filtered off. The solvent is then recovered. The di-substituted malonic acid is then gradually heated to approx. 145° C. and then slowly to 150–155° C. and when $CO_2$ ceases to be evolved, the anhydrous silica jell, or similar cyclizing catalytic agent added and the product heated to between 175 and 250° C. for 3 to 5 hours. The resulting cyclopenten-2-one-1 compound is then distilled under greatly reduced pressure. The amount of the cyclizing catalytic agent to be added depends upon the chain length of the aliphatic group in the 2 position of the cycloaliphatic nucleus, as $-n-R_2$. It is advisable to use between 10 and 15%, although where $R_2$ has less than 8 carbon atoms as little as 5% may be sufficient. The preferred temperature at which the cyclizing reaction takes place smoothly and in yields of between 75 and 90% of theory is 175–195° C.; the longer the chain length of $R_2$ the higher temperature that will be required.

The alkylene oxides having from 2 to 12 carbon atoms may also have a phenyl group, or substituted phenyl group on a terminal methylene group, such as phenyl ethylene, phenyl propylene, phenyl butylene, phenyl octylene etc. The substituted phenyls should preferably have an alkyl group ortho to the alkylene oxide group and a hydroxy or carboxy group meta to the alkyl group. These supply the alkyl or phenyl alkyl group at position 3 ($R_1$) of the cyclopenten-2-one-1 nucleus.

The cycloaliphatic compounds as herein defined and forming the bases of my invention, may be generically represented by the following structural formulae:

(I) 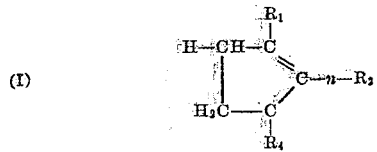

Wherein $R_1$ signifies an alkyl group having not more than 8 carbon atoms in its molecule. $R_2$ is aliphatic group having a polar terminal and not more than 20 carbon atoms in its chain. $R_4$ represents a functional group.

(II) 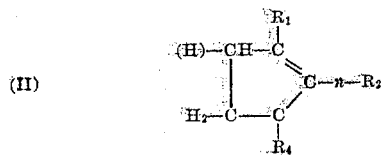

Wherein $R_1$ is an aralkyl, the aromatic group being selected from the benzene series of hydrocarbons and the alkyl group has not more than 8 carbon atoms in its molecule.

(III) 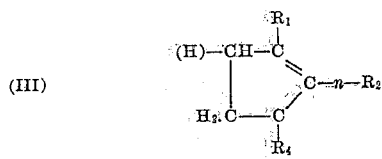

wherein $R_1$ is aralkyl, the alkyl group of which has not more than 8 carbon atoms and aromatic radical also has a hydroxy or carboxy group in a position para to the alkyl and also an alkyl group of not more than 3 carbon atoms in a position meta to the carboxy or hydroxy group.

To one versed in the art it is obvious that a wide range of cycloaliphatic compounds falling within the scope of my invention may be prepared and would require several years to explore, notwithstanding I have prepared more than 80 compounds of the cyclopenten-2-one-1 nucleus the larger number of which have indicated that the whole class may be used as bases for preparing antibiotics and germicidal products. A number have shown valuable odor values as flavor and perfume intermediates, and some have been converted into the corresponding amino acids and beta mercapto amino acids, therefore, my invention entitles itself to the broad generic class indicated.

In order to clearly define my invention and the means by which the products thereof are to be prepared, the following examples are given merely as illustrations thereof, and are not intended as limiting the scope or means whereby the products may be prepared and the only limitation which is placed upon my invention is that imposed upon me by the claims appended hereto.

It will be observed that the reactants given in the following equations may be modified within wide limits, as for example, the alkylene oxide may have from 2 to 12 carbon atoms, and may have a phenyl or substituted phenyl group, as shown by formulae (I), and (II) and (III) preceding, without changing the spirit of the invention. The malonic acid may be substituted for any other polybasic acid capable of di sodium substitution. The secondary reactant ($X-n-R_2$) may have the halogen on its omega carbon group and up to 20 carbon atoms in its molecule. $R_2$ is a polar group such as hydroxy, carboxy.

The use of these bases in preparing the various other compounds are set forth in my continuation applications Serial Nos. 26,934 and 26,935 filed simultaneously herewith and both now abandoned.

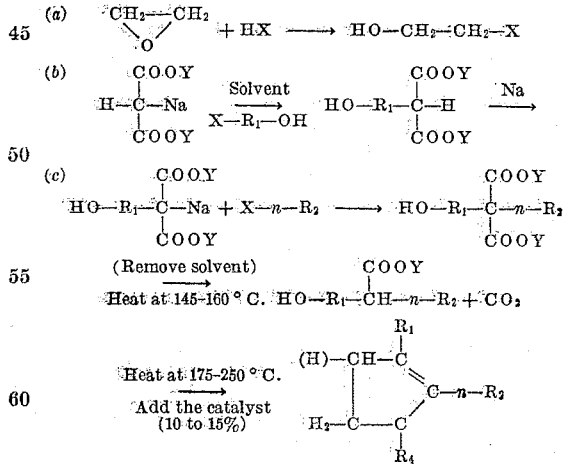

The reaction between the reagents in steps (a) to (c) inclusive, are conducted preferably between 10 and 20° C. but not above 50° C. The last two steps of the reaction are conducted at an elevated temperature as indicated. The foregoing by way of example indicates the wide variations which may be carried out.

*Example 1*

(I) In a suitable apparatus having a means of stirring, cooling and heating is placed 20 moles of the alkylene oxide, or the aromatic or substituted aromatic alkylene oxide, as for example 1161 gms. (20 moles) propylene oxide, the stirrer is started and the temperature lowered to 50° C. preferably between 10 and 20° C. To the cold solution is added (a cold solution of 48%) 4046.2 gms. (20 moles with excess) hydrogen bromide. After all the hydrogen bromide was added the solution was then heated to 80° C. and stirred for one hour. Upon distillation there was obtained (from five consecutive runs), 2763 gms. of beta hydroxy propylene bromide, approx. 99% of theory.

(II) In a conventional manner, at 10–15° C. 460 gms. finely divided sodium is dissolved in 6 liters anhydrous alcohol and to this is added 2100 gms. (20 moles) (99.6% purity) malonic acid when the reaction is completed. 2785 gms. (20 moles) beta hydroxy propyl bromide is added in a rapid stream. Sodium bromide separates out and is filtered off. The salt cake is washed with a small quantity of ice cold anhydrous alcohol. The filtrate is returned to the reaction apparatus, cooled and an additional 460 gms. (20 atoms) finely divided sodium added. Solution at 10–15° C. requires approx. 5 hours.

(III) There is added in a rapid continuous stream 3061 gms. (20 moles) butylene (1:4) bromohydrin. Sodium bromide separates immediately and is filtered off. The salt cake washed with ice cold, anhydrous alcohol. The alcohol solvent removed by atmospheric distillation. Heating is continued to 145–160° C. $CO_2$ is evolved. 300 gms. anhydrous silica jell added, the mixture stirred and heated to between 175–250° C. preferably at 185° C. for 3.5 hours. The reaction mixture distilled, collecting the fraction boiling at 108–110° C. at 4.0/4.5 mm. vacuum, amounting to 2405 gms. (—78% of theory).

The 2(3 hydroxy propyl) 3 methyl cyclopenten-2-one-1, obtained in the above reactions, may be converted into the corresponding 2 (halogen propyl) derivative and this upon treatment with a molecular equivalent of sodium acet amido malonic ester, converted into, upon simultaneous hydrolysis and decarboxylation, the corresponding amino acid: 2-carboxy alpha amino butyl-3-methyl cyclopenten-2-one-1. This may then be halogenated in the beta carbon of the 2-norvaline substituent and converted into the mercapto compound and used as a base for obtaining the thiazolidine compound as an intermediate for producing the oxazolone germicidal and antibiotic bodies.

Example 2

Analagous to the procedure given in the preceding examples, following steps (I) to (III) 3061 gms. (20 moles) (1:2) butylene bromohydrin is prepared and reacted with 2525 gms. (20 moles sl. excess) sodium malonate. The resulting beta hydroxy butyl malonic acid is treated with 460 gms. sodium and then with (20 moles) 3340 gms. omega bromo pentanol. The salt is filtered and washed, the solvent recovered. Heated at 152–155° C. until evolution of $CO_2$ ceases, 450 gms. Brockman's modified alumina added and heated at 185° C. for 3 hours, and the resulting mixture distilled, collecting the fraction boiling at 118–120° C. under 3 mm. pressure, amounting to 2692 gms. (80% of theory).

The 2 (4 hydroxy butyl) 3 ethyl-cyclopenten-2-one-1, may be converted into the corresponding amino acid—thence to the mercapto amino acid, the thiazolidine and finally to the oxazolone as hereinbefore described.

Example 3

In a manner analagous to Example 1, steps (I) to (III) there is reacted: 2704 gms. (20 moles) phenyl propylene oxide; 4046 gms. (20 moles —48%) hydrogen bromide; 920 gms. finely divided sodium (in 8 liters anhydrous alcohol) 2100 gms. (20 moles 99.6%) malonic acid and 3340 gms. (20 moles) 1:5-pentylene bromohydrin (omega bromo amyl alcohol). After removing the solvent, as in Example 1, the di substituted malonic acid is heated to 150° C. until the evolution of $CO_2$ ceases, approx. 2 hours. There is then added 350 gms. of acid washed, anhydrous alumina, magnesium aluminum silicate

$$(MgAlSiO_2)_x$$

and the mixture stirred and heated to 190° C. for 3 hours. The resulting mixture then distilled under reduced pressure, collecting the fraction boiling between 160–163° C. under 2 mm. pressure and amounting to 3621 gms. (approx. 74% of theory).

The 2-(4 hydroxy butyl)-3 phenyl methylene-cyclopenten-2-one-1, may be converted into the amino acid, mercapto amino acid, thiazolidine and oxazolone as described herein.

Example 4

In a manner analagous to Examples 1 and 3, the phenyl propylene oxide is substituted by 3025 gms. (20 moles) of para hydroxy phenyl propylene oxide. The resulting 2-(4 hydroxy butyl)-3-(para hydroxy phenyl methylene)-cyclopenten (2:3-one-1) distills at 165–160° C. at 1/1.5 mm.

By substituting the propylene oxide of step (I) for other alkylene oxides having from 2 to 12 carbon atoms, and the aliphatic omega halogen compound in step (III) for other halogen compounds having from 4 to 20 carbon atoms, wide variations in the cycloaliphatic compounds are readily prepared and fully within the scope of my invention, as perfume and flavor intermediates or as bases for the preparation of amino acids, mercapto amino acids, thiazolidines, germicidal and antibiotic agents and oxazolones.

In a manner analagous to the preceding examples, the cycloaliphatic compounds of my invention may be readily prepared by first preparing alpha and gamma substituted butyryl lactones. The alpha substituent having not more than 20 carbon atoms in its molecule with a carboxylic acid or hydroxy group terminal, corresponding to $-n-R_2$ of the structure. The gamma substituent has not more than 8 carbon atoms in its chain, may be alkyl or aralkyl, corresponding to $R_1$ of the structure. These alpha and gamma substituted butyryl lactones are prepared according to the methods hereinbefore mentioned. Some examples of these di substituted lactones are: (1) alpha hydroxy heptyl gamma methyl butyryl lactone boiling at 140–142° C. under 4.5/5 mm. pressure; (2) alpha hydroxy heptyl gamma ethyl butyryl lactone boiling at 138–140° C. at 3.5/4 mm. pressure; (3) alpha hydroxy hexyl gamma normal amyl butyryl lactone boiling at 128–130° C. 3 mm. pressure; (4) alpha hydroxy amyl gamma iso butyl butyryl lactone boiling at 140–142° C. at 3 mm. pressure; (5) alpha hydroxy tridecyl gamma phenyl methyl butyryl lactone, boiling at 180–184° C. at 2 mm. pressure. After preparing the di-substituted butyryl lactone by the methods given in the technical literature, the lactone is mixed with from 10 to 15% of the cyclizing catalytic agent herein described and the reaction completed at between 175 and 250° C. according to step (IV) in the examples preceding. The lactones above have the structure:

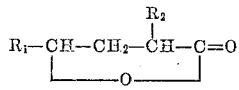

wherein $R_1$ corresponds to the alkyl or alkaryl group in the 3rd position, of the cyclopenten-2-one-1 nucleus, the alkyl group of which has not more than 8 carbon atoms, and $R_2$ is the aliphatic group of position 2 having a carboxylic acid or hydroxy polar terminal group and not more than 20 carbon atoms.

*Example 5*

Alpha hydroxy heptyl gamma methyl butyryl lactone, boiling at 140–142° C. 4.5/5 mm. pressure, prepared by the methods given in the technical literature and having the structure:

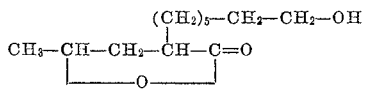

2142 gms. (10 moles) of the lactone is intimately mixed with 250 gms. of silica jell and the mixture heated to between 175 and 250° C. After the cyclization reaction is completed, requiring approximately 3 hours, the product is distilled, collecting the fraction boiling at 108–110° C. at 3 mm. pressure amounting to beween 1840 and 1845 gms. (93.8–94.2% of theory) of 2-(6-hydroxy hexyl)-3-methyl-cyclopenten-2-one-1.

Having therefore described my invention and shown by many examples and illustrations the means whereby the products thereof are prepared and indicated the uses to which the products thereof are applicable and new, what I seek therefore to protect in Letters Patent, is:

A process for the manufacture of a compound of the formula

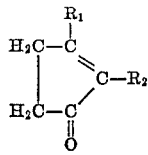

in which $R_1$ is a substituent selected from the group consisting of alkyl and aralkyl radicals, the alkyl group of which contains no more than 8 carbon atoms and $R_2$ is a straight chain alkane radical carrying a terminal hydroxy group and containing not over 20 carbon atoms which comprises reacting a halogen hydrin with an alkali metal compound of a malonic acid compound of the formula

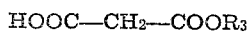

wherein $R_3$ is selected from the group consisting of hydrogen and alkyl radicals, reacting the resulting substituted malonic acid compound with an alkali metal, and reacting the resulting alkali metal compound with an alpha halogen omega hydroxy substituted straight chained alkane having not more than 20 carbon atoms, separating the resulting di-substituted malonic acid compound from the alkali metal halide formed, heating such compound above 140° C. to eliminate $CO_2$, adding a cyclizing catalytic agent selected from the group consisting of anhydrous silica gel, alumina and magnesium aluminum silicate and heating at a temperature of about 175° C. and 250° C. to effect cyclization.

ALBERT FRANK BOWLES.

REFERENCES CITED

The following references are of record in the file of this patent:

UNITED STATES PATENTS

| Number | Name | Date |
|---|---|---|
| 1,944,731 | Diels et al. | Jan. 23, 1934 |
| 2,044,968 | Bruson | June 23, 1936 |
| 2,083,482 | Steindorff et al. | June 8, 1937 |
| 2,130,989 | Schimmelschmidt | Sept. 20, 1938 |
| 2,329,432 | Bruson | Sept. 14, 1943 |
| 2,369,158 | Milas | Feb. 13, 1945 |
| 2,387,587 | Hunsdiecker | Oct. 23, 1945 |
| 2,407,672 | Milas | Sept. 17, 1946 |

FOREIGN PATENTS

| Number | Country | Date |
|---|---|---|
| 755,069 | France | Nov. 18, 1933 |